United States Patent
Shetti et al.

(10) Patent No.: US 10,447,619 B2
(45) Date of Patent: Oct. 15, 2019

(54) DYNAMIC APPLICATION BUFFER ADAPTATION FOR PROXY BASED COMMUNICATION

(71) Applicant: Verizon Patent and Licensing Inc., Arlington, VA (US)

(72) Inventors: Shrinivas Shetti, Bengaluru (IN); Feng Li, Lexington, MA (US); Jae Won Chung, Lexington, MA (US); Stanley Junkert, Roanoke, TX (US); Douglass E. Walker, Brookline, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 307 days.

(21) Appl. No.: 15/459,439

(22) Filed: Mar. 15, 2017

(65) Prior Publication Data

US 2018/0270170 A1   Sep. 20, 2018

(51) Int. Cl.
| | |
|---|---|
| *H04L 12/861* | (2013.01) |
| *H04L 29/08* | (2006.01) |
| *H04L 29/06* | (2006.01) |
| *H04W 80/06* | (2009.01) |
| *H04N 21/222* | (2011.01) |

(52) U.S. Cl.
CPC ...... *H04L 49/9005* (2013.01); *H04L 65/1033* (2013.01); *H04L 65/607* (2013.01); *H04L 65/80* (2013.01); *H04L 67/28* (2013.01); *H04L 69/16* (2013.01); *H04N 21/222* (2013.01); *H04W 80/06* (2013.01)

(58) Field of Classification Search
CPC ... H04L 65/1033; H04L 65/607; H04L 65/80; H04L 67/28; H04L 67/32; H04L 49/9005; H04L 69/16; H04N 21/00; H04W 80/06

USPC .................................................. 709/232
See application file for complete search history.

(56) References Cited

U.S. PATENT DOCUMENTS

| | | | | |
|---|---|---|---|---|
| 5,963,202 | A * | 10/1999 | Polish | H04N 7/17336 715/723 |
| 2002/0165970 | A1* | 11/2002 | Ludewig | H04L 29/06 709/228 |
| 2002/0194609 | A1* | 12/2002 | Tran | H04N 21/42692 725/95 |
| 2008/0114894 | A1* | 5/2008 | Deshpande | H04L 65/608 709/237 |

(Continued)

OTHER PUBLICATIONS

Ericsson, "Revised Work Item on shortened TTI and processing time for LTE," 3GPP TSG RAN Meeting #74, Vienna, Austria, Dec. 5-8, 2016, 8 pages.

*Primary Examiner* — Ruolei Zong

(57) ABSTRACT

A device may identify a proxy connection associated with a first device and a second device. An application buffer of the proxy connection may be associated with a first buffer size for at least one of the first device or the second device. The proxy connection may be associated with a video communication. The device may determine a set of parameters relating to the proxy connection. The device may determine a buffer allocation for the proxy connection based on the set of parameters. The device may perform an alteration to the application buffer of the proxy connection to cause the application buffer of the proxy connection to be associated with a second buffer size. The second buffer size may be different from the first buffer size.

20 Claims, 5 Drawing Sheets

(56) References Cited

U.S. PATENT DOCUMENTS

2013/0308919 A1* 11/2013 Shaw ................. H04N 21/2221
386/239
2014/0012972 A1* 1/2014 Han ....................... H04L 49/90
709/224
2018/0241836 A1* 8/2018 Arsenault ........... H04L 67/2847

* cited by examiner

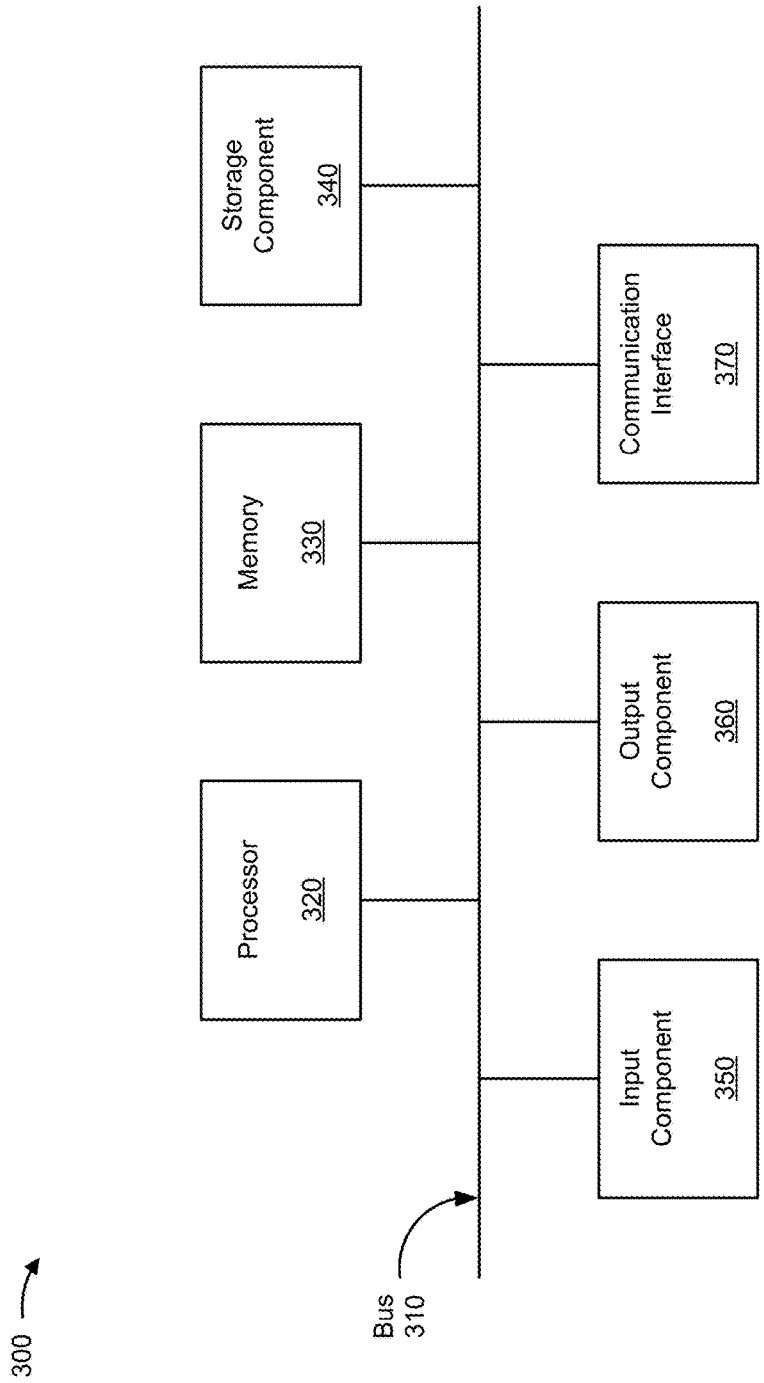

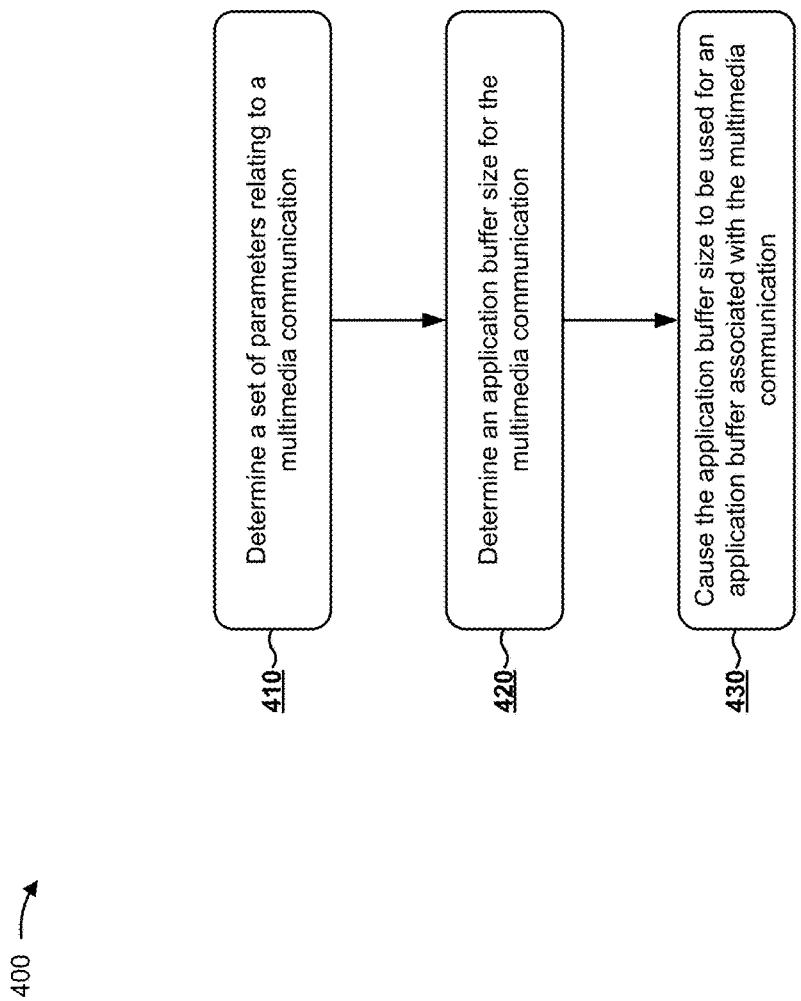

DYNAMIC APPLICATION BUFFER ADAPTATION FOR PROXY BASED COMMUNICATION

BACKGROUND

A transparent proxy can be used to direct traffic at a network layer without configuration by a user device. For example, a service provider, such as a network operator, can utilize a transparent transmission control protocol (TCP) proxy to perform TCP traffic routing without subscribers, such as user device users, being required to configure the TCP traffic routing. A TCP proxy configuration, such as for transparent TCP proxying, can include a provider-side application buffer (e.g., an application buffer associated with a server device providing multimedia communication) and a subscriber-side application buffer (e.g., an application buffer associated with a user device receiving the multimedia communication).

BRIEF DESCRIPTION OF THE DRAWINGS

FIG. 3 is a diagram of example components of one or more devices of FIG. 2; and

FIG. 4 is a flow chart of an example process for dynamic application buffer adaptation.

DETAILED DESCRIPTION OF PREFERRED EMBODIMENTS

The following detailed description of example implementations refers to the accompanying drawings. The same reference numbers in different drawings can identify the same or similar elements.

A network operator can use a proxy device to establish a proxy, such as a transparent transmission control protocol (TCP) proxy, another type of TCP proxy, a user datagram protocol (UDP) proxy, and/or the like, to route traffic in a network. For example, a transparent TCP proxy can be deployed to manage routing of streaming video traffic from a server device, such as from a server device providing a streaming video website, a server device of a content delivery network (CDN), and/or the like. The proxy can be associated with a set of buffers, such as a provider-side application buffer associated with a provider-side server device, a subscriber-side application buffer associated with a subscriber-side user device, and/or the like. However, when a buffer size of a buffer, of the set of buffers, does not satisfy a first threshold size (e.g., the buffer size is smaller than a first threshold), throughput of a proxy communication including the buffer can be limited. Similarly, when the buffer size satisfies a second threshold size (e.g., the buffer size is greater than a second threshold), a maximum quantity of connections that the buffer can support can be limited.

Implementations, described herein, can dynamically adapt a buffer size of an application buffer for proxy based multimedia communications, such as streaming video communications, streaming audio communications, and/or the like. In this way, throughput is improved relative to a static buffer configuration that does not satisfy the first threshold size and a quantity of connections can be increased relative to a static buffer configuration that satisfies the second threshold size. Moreover, a likelihood of performing unnecessary buffering for multimedia communication sessions that are dropped within a threshold period of time is reduced, thereby reducing utilization of network resources relative to a static buffer configuration. Furthermore, a likelihood of application buffer leakage is reduced relative to a static buffer configuration, thereby reducing a utilization of memory resources.

Figure 1A:
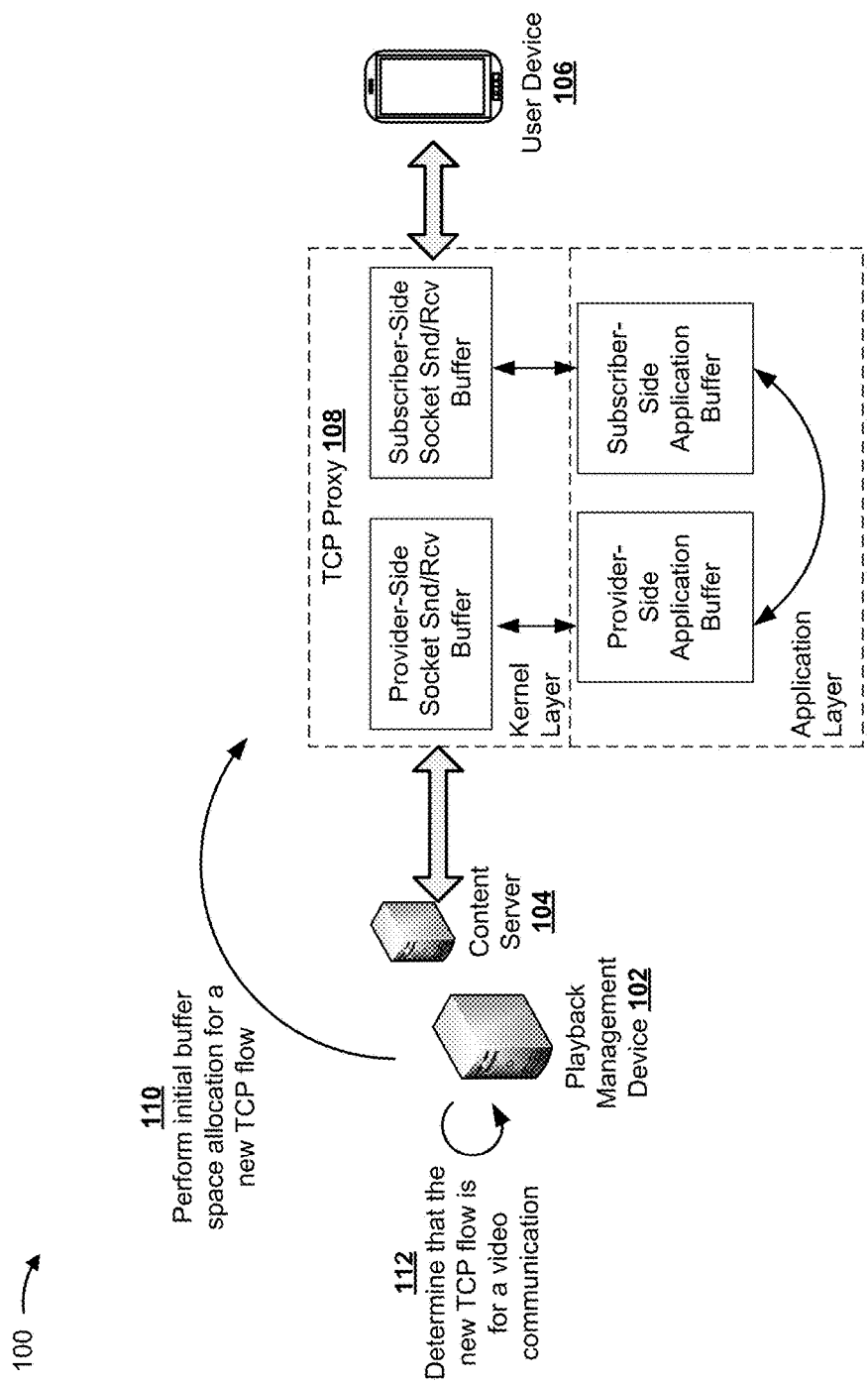
FIGS. 1A and 1B are diagrams of an overview of an example implementation described herein.
Figure 1B:
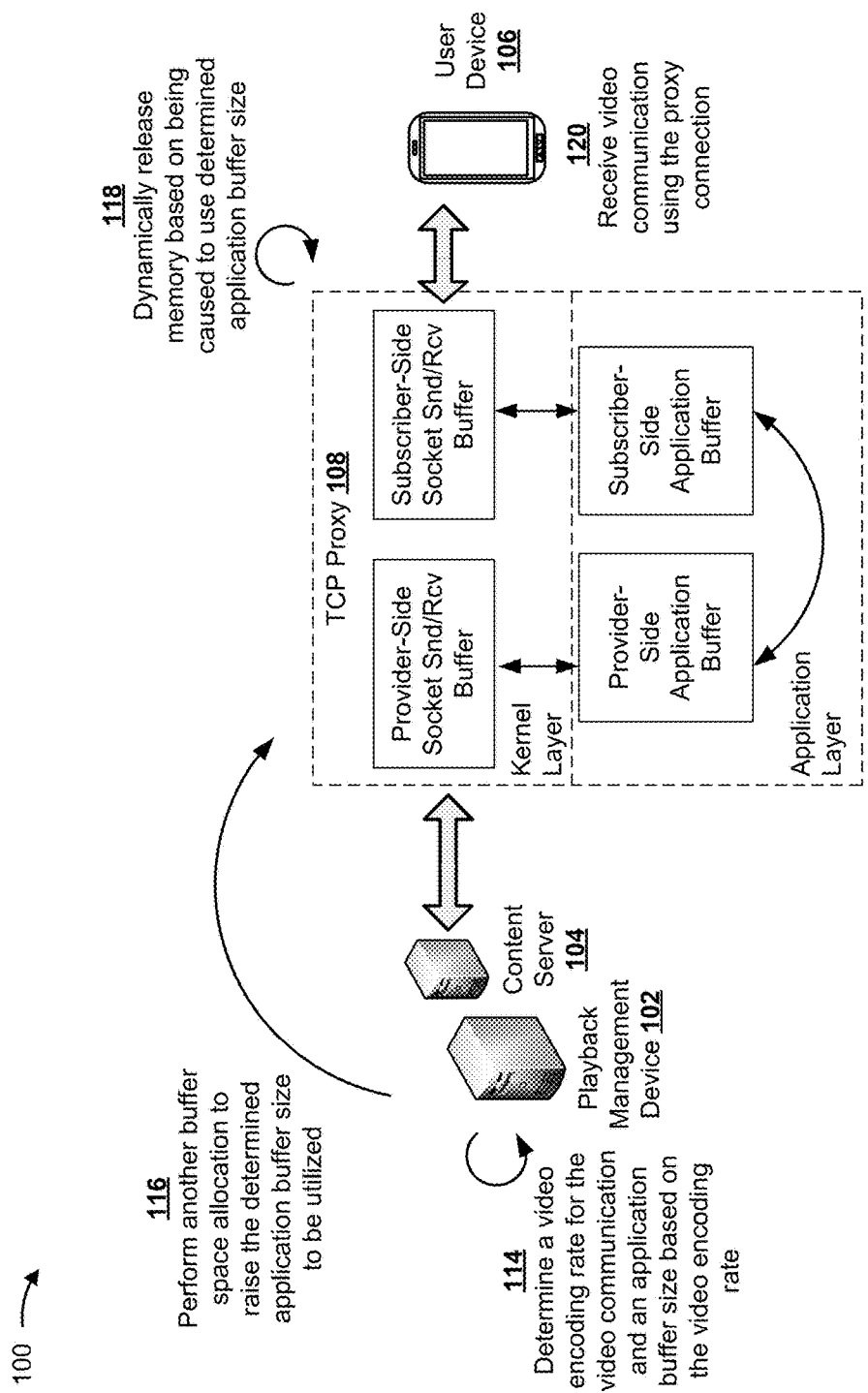

FIGS. 1A and 1B are diagrams of an overview of an example implementation 100 described herein. As shown in FIGS. 1A and 1B, example implementation 100 can include a playback management device 102, a content server 104, and a user device 106. A TCP proxy 108 can be configured by a proxy device (not shown) for user device 106 to permit user device 106 to receive streaming video content from content server 104 associated with a service provider (e.g., an Internet service provider (ISP)) via a base station (not shown). TCP proxy 108 can include, in the application layer, a provider-side application buffer and a subscriber-side application buffer; and, in the kernel layer, a provider-side socket send-receive ("Snd/Rcv") buffer and a subscriber-side socket send-receive buffer.

As further shown in FIG. 1A, and by reference number 110, playback management device 102 can perform an initial buffer space allocation to configure TCP proxy 108 for a new TCP flow. For example, playback management device 102 can allocate a particular amount of memory for TCP proxy 108 for the provider-side application buffer for content server 104 providing content, a particular amount of memory allocated to the subscriber-side application buffer for user device 106, and/or the like. Based on the particular amount of memory, the provider-side application buffer and/or the subscriber-side application buffer can be associated with a particular initial buffer size. In some implementations, the initial buffer space allocation can satisfy a threshold buffer size. For example, playback management device 102 can select a threshold application buffer size to ensure that throughput from content server 104 is not limited by the subscriber-side application buffer. As shown by reference number 112, playback management device 102 can determine that the new TCP flow is to be utilized for a video communication. For example, playback management device 102 can detect the new TCP flow is associated with providing video content to user device 106 from content server 104 using TCP proxy 108 based on information identifying content server 104, information obtained based on parsing data traffic provided via the new TCP flow, and/or the like.

As shown in FIG. 1B, and by reference number 114, playback management device 102 can determine a video encoding rate for the video communication, and can determine an application buffer size based on the video encoding rate. For example, playback management device 102 can determine an alteration to the application buffer size for the provider-side application buffer, the subscriber-side application buffer, and/or the like. In some implementations, playback management device 102 can determine the alteration to the application buffer size based on a buffering time. For example, playback management device 102 can determine the application buffer size based on a combination of the video encoding rate and the buffering time. In some implementations, playback management device 102 can determine the application buffer size based on a default video encoding rate, such as when playback management device 102 cannot determine an actual video encoding rate of the video communication.

As further shown in FIG. 1B, and by reference number 116, playback management device 102 can perform another buffer space allocation to cause the determined application buffer size to be utilized. For example, playback management device 102 can transmit information to content server 104, the proxy device, user device 106, and/or the like to cause the determined application buffer size to be utilized for TCP proxy 108 at the provider-side application buffer, the subscriber-side application buffer, and/or the like. As shown by reference number 118, playback management device 102 can cause memory to be dynamically released based on TCP proxy 108 being caused to use the determined application buffer size. For example, based on data in an application buffer, such as the provider-side application buffer, the subscriber-side application buffer, and/or the like, being released from the application buffer for transmission or playback, memory allocated to the application buffer can be released and reallocated to another functionality of content server 104, proxy device, user device 106, and/or the like. As shown by reference number 120, user device 106 can receive the video communication using TCP proxy 108 based on playback management device 102 dynamically configuring the application buffer size based on the determined application buffer size.

In this way, playback management device 102 dynamically configures an application buffer size, thereby reducing a likelihood that TCP proxy 108 excessively limits throughput and/or connections. Moreover, based on dynamically reallocating a portion of an application buffer, playback management device 102 reduces a utilization of memory resources relative to unnecessarily maintaining the memory resources for the application buffer.

Although implementations, described herein, are described in terms of an application buffer for a TCP proxy connection for video communication, implementations described herein can be utilized for another type of proxy connection and/or for another type of communication.

As indicated above, FIGS. 1A and 1B are provided merely as an example. Other examples are possible and can differ from what was described with regard to FIGS. 1A and 1B.

Figure 2:
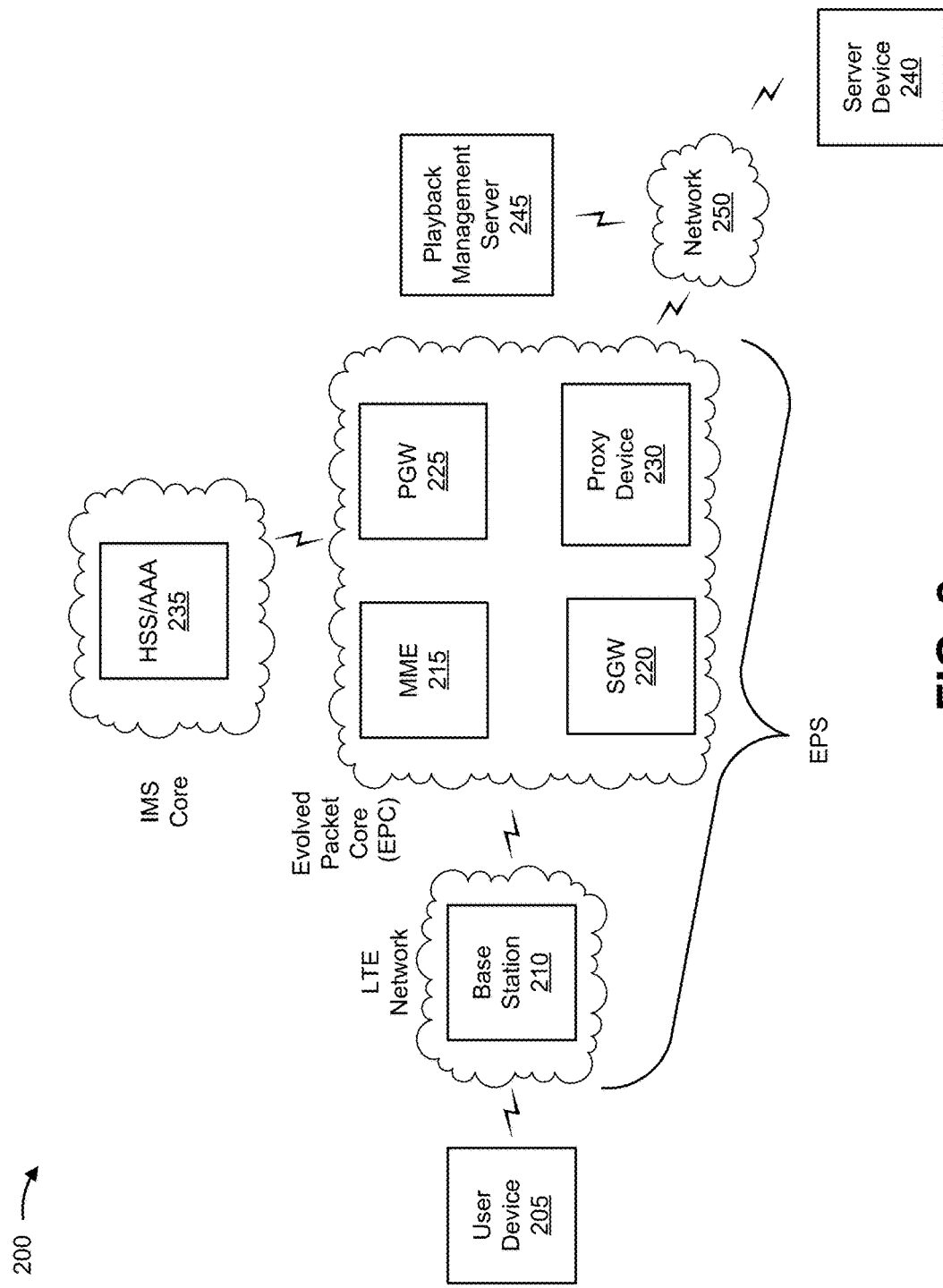
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a user device 205, a base station 210, a mobility management entity device (MME) 215, a serving gateway (SGW) 220, a packet data network gateway (PGW) 225, a proxy device 230, a home subscriber service/authentication, authorization, and accounting server (HSS/AAA) 235, a server device 240, a playback management device 245, and a network 250. Devices of environment 200 can interconnect via wired connections, wireless connections, or a combination of wired and wireless connections.

Some implementations are described herein as being performed within a long-term evolution (LTE) network for explanatory purposes. Implementations can be performed within a network that is not an LTE network, such as a satellite network, a Wi-Fi network, a third generation (3G) network, a code division multiple access (CDMA) network, or a next generation network, such as a 5G network.

Environment 200 can include an evolved packet system (EPS) that includes an LTE network and/or an evolved packet core (EPC) that operate based on a 3GPP wireless communication standard. The LTE network can include a radio access network (RAN) that includes one or more base stations 210 that take the form of evolved Node Bs (eNBs) via which user device 205 communicates with the EPC. The EPC can include MME 215, SGW 220, PGW 225, and/or proxy device 230 that enable user device 205 to communicate with network 250 and/or an Internet protocol (IP) multimedia subsystem (IMS) core. The IMS core can include HSS/AAA 235, and can manage device registration and authentication, session initiation, etc., associated with user devices 205. HSS/AAA 235 can reside in the EPC and/or the IMS core.

User device 205 includes one or more devices capable of connecting to a network via base station 210. For example, user device 205 can include a communication device, such as a mobile phone (e.g., a smart phone or a radiotelephone) a tablet computer, a wearable communication device (e.g., a smart wristwatch or a pair of smart eyeglasses), or a similar type of device. User device 205 can send traffic to and/or receive traffic from network 250 via base station 210 (e.g., based on a radio access bearer between user device 205 and SGW 220). In some implementations, user device 205 corresponds to user device 106 shown in FIGS. 1A and 1B.

Base station 210 includes one or more devices capable of transferring traffic, such as audio, video, text, and/or other traffic, destined for and/or received from user device 205. In some implementations, base station 210 can include an eNB associated with the LTE network that receives traffic from and/or sends traffic to network 250 via SGW 220 and/or PGW 225. Additionally, or alternatively, one or more base stations 210 can be associated with a RAN that is not associated with an LTE network. Base station 210 can send traffic to and/or receive traffic from user device 205 via an air interface (e.g., a radio frequency (RF) signal). In some implementations, base station 210 can include a small cell base station, such as a base station of a microcell, a picocell, and/or a femtocell. In some implementations, base station 210 corresponds to the base station described with regard to FIGS. 1A and 1B.

MME 215 includes one or more devices, such as one or more server devices, capable of managing authentication, activation, deactivation, and/or mobility functions associated with user device 205. In some implementations, MME 215 can perform operations relating to authentication of user device 205. Additionally, or alternatively, MME 215 can facilitate the selection of a particular SGW 220 and/or a particular PGW 225 to serve traffic to and/or from user device 205. MME 215 can perform operations associated with handing off user device 205 from a first base station 210 to a second base station 210 when user device 205 is transitioning from a first cell associated with the first base station 210 to a second cell associated with the second base station 210. Additionally, or alternatively, MME 215 can select another MME (not pictured), to which user device 205 should be handed off (e.g., when user device 205 moves out of range of MME 215).

SGW 220 includes one or more devices capable of routing packets. For example, SGW 220 can include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and transfers traffic. In some implementations, SGW 220 can aggregate traffic received from one or more base stations 210 associated with the LTE network, and can send the aggregated traffic to network 250 (e.g., via PGW 225) and/or other network devices associated with the EPC and/or the IMS core. Additionally, or alternatively, SGW 220 can receive traffic from network 250 and/or other network devices, and can send the received traffic to user device 205 via base station 210. Additionally, or alternatively, SGW 220 can perform operations associated with handing off user device 205 to and/or from an LTE network.

PGW 225 includes one or more devices capable of providing connectivity for user device 205 to external packet data networks (e.g., other than the depicted EPC and/or LTE network), such as network 250. For example, PGW 225 can include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 can aggregate traffic received from one or more SGWs 220, and can send the aggregated traffic to network 250. Additionally, or alternatively, PGW 225 can receive traffic from network 250, and can send the traffic to user device 205 via SGW 220 and base station 210. PGW 225 can record data usage information (e.g., byte usage), and can provide the data usage information to HSS/AAA 235.

Proxy device 230 includes one or more devices capable of receiving, storing, processing, controlling, and/or providing information associated with a flow. For example, proxy device 230 can include a server device (e.g., a proxy server), a cloud computing device, or a similar device. In some implementations, proxy device 230 can receive traffic from server device 240 (e.g., via network 250) and can provide the traffic to user device 205 (e.g., via base station 210) and/or can receive traffic from user device 205 (e.g., via base station 210) and can provide the traffic to server device 240 (e.g., via network 250). In some implementations, proxy device 230 can be associated with and/or correspond to a portion of TCP proxy 108 shown in FIGS. 1A and 1B.

HSS/AAA 235 includes one or more devices, such as one or more server devices, capable of managing (e.g., receiving, generating, storing, processing, and/or providing) information associated with user device 205. For example, HSS/AAA 235 can manage subscription information associated with user device 205, such as information that identifies a subscriber profile of a user associated with user device 205, information that identifies services and/or applications that are accessible to user device 205, location information associated with user device 205, a network identifier (e.g., a network address) that identifies user device 205, information that identifies a treatment of user device 205 (e.g., quality of service information, a quantity of minutes allowed per time period, a quantity of data consumption allowed per time period, etc.), information that identifies whether user device 205 is associated with an RF access signaling usage control policy and/or an RF access signaling usage billing policy, and/or similar information. HSS/AAA 235 can provide this information to one or more other devices of environment 200 to support the operations performed by those devices.

Additionally, or alternatively, HSS/AAA 235 and/or a policy charging and rules function (PCRF) server device can perform authentication operations for user device 205 and/or a user of user device 205 (e.g., using one or more credentials), can control access, by user device 205, to a service and/or an application (e.g., based on one or more restrictions, such as time-of-day restrictions, location restrictions, single or multiple access restrictions, read/write restrictions, RF access signaling usage restrictions, etc.), can track resources consumed by user device 205 (e.g., a quantity of voice minutes consumed, a quantity of data consumed, a quantity of RF signals transmitted, a quantity of radio access bearers requested and/or established, etc.), and/or can perform similar operations.

Server device 240 includes one or more devices capable of providing content. For example, server device 240 can include a server (e.g., a host server, a web server, an application server, etc.), a cloud computing device, a content delivery network device, or a similar device. Additionally, or alternatively, server device 240 can be associated with providing video, audio, images, webpages, text, data, and/or some combination thereof. In some implementations, server device 240 can correspond to content server 104 shown in FIGS. 1A and 1B.

Playback management device 245 includes one or more devices capable of controlling playback of content provided from server device 240 to user device 205. For example, playback management device 245 can include a server device (e.g., a host server, a web server, an application server, etc.), a cloud computing device, or a similar device. Additionally, or alternatively, playback management device 245 can provide, to user device 205, proxy device 230, server device 240, and/or the like, information associated with identifying an application buffer size for a provider-side application buffer, a subscriber-side application buffer, and/or the like. In some implementations, playback management device 245 corresponds to playback management device 102 shown in FIGS. 1A and 1B.

Network 250 includes one or more wired and/or wireless networks. For example, network 250 can include a cellular network (e.g., an LTE network, a 5G network, a 3G network, a CDMA network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, a satellite network, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

FIG. 3 is a diagram of example components of a device 300. Device 300 can correspond to user device 205, base station 210, MME 215, SGW 220, PGW 225, proxy device 230, HSS/AAA 235, server device 240, and/or playback management device 245. In some implementations, user device 205, base station 210, MME 215, SGW 220, PGW 225, proxy device 230, HSS/AAA 235, server device 240, and/or playback management device 245 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA)

and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, and/or the like.

Device 300 can perform one or more processes described herein. Device 300 can perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

FIG. 4 is a flow chart of an example process 400 for dynamic application buffer adaptation. In some implementations, one or more process blocks of FIG. 4 can be performed by playback management device 245. In some implementations, one or more process blocks of FIG. 4 can be performed by another device or a group of devices separate from or including playback management device 245, such as user device 205, base station 210, MME 215, SGW 220, PGW 225, proxy device 230, HSS/AAA 235, and/or server device 240.

As shown in FIG. 4, process 400 can include determining a set of parameters relating to a multimedia communication (block 410). For example, playback management device 245 can determine the set of parameters relating to the multimedia communication. In some implementations, playback management device 245 can determine a parameter relating to whether a flow associated with a proxy connection is a new flow. A new flow can refer to a flow that has been newly created within a threshold period of time and/or a flow for which playback management device 245 is unable to determine a type of the flow (e.g., a HTTPS flow for which playback management device 245 is unable to determine a type of information being provided via the HTTPS flow). For example, playback management device 245 can determine that a TCP flow, associated with a transparent TCP connection, is newly created to permit server device 240 to provide multimedia communications to user device 205. In this case, playback management device 245 can determine an initial allocation of resources to cause an application buffer associated with the new flow to be associated with an initial buffer size. In some implementations, the initial buffer size can be a default buffer size. For example, playback management device 245 can determine the initial buffer size based on stored information identifying a default buffer size, such as a 30 megabyte (MB) default buffer size, a 20 MB default buffer size, and/or the like.

In some implementations, playback management device 245 can determine a parameter relating to whether the flow (e.g., a flow that is not a new flow) is a multimedia flow, such as a video flow, an audio flow, and/or the like. For example, playback management device 245 can determine that the flow is a multimedia flow based on information associated with indicating that a video session is being provided via the flow. In some implementations, playback management device 245 can determine that the flow is a multimedia flow based on a packet snooping technique associated with parsing packets of the flow. Additionally, or alternatively, playback management device 245 can determine that the flow is a multimedia flow based on a server domain name, a server name indicator (SNI), an Internet protocol address, and/or the like associated with server device 240, which is providing data via the flow. Additionally, or alternatively, when the flow is a secure flow, such as an HTTPS flow, playback management device 245 can determine that the flow is a multimedia flow based on a handshake message, such as an HTTPS "hello message" (also termed a "Client Hello" message), associated with establishing a communication session associated with the flow.

In some implementations, playback management device 245 can determine a data encoding rate associated with the flow, a buffering time associated with the flow, and/or the like, as described herein.

In this way, playback management device 245 can determine a set of parameters relating to a multimedia communication.

As further shown in FIG. 4, process 400 can include determining an application buffer size for the multimedia communication (block 420). For example, playback management device 245 can determine the application buffer size for the multimedia communication. In some implementations, playback management device 245 can determine the application buffer size based on a data encoding rate parameter. For example, playback management device 245 can determine a video encoding rate based on information provided by server device 240, based on identifying server device 240 (e.g., a particular content source can be associated with a particular video encoding rate), and/or the like. In some implementations, playback management device 245 can determine the application buffer size based on a default data encoding rate. For example, when playback management device 245 is unable to determine a video encoding rate, playback management device 245 can utilize a stored, default video encoding rate (e.g., a 1.5 Megabytes per second (Mbps) video encoding rate, a 3 Mbps video encoding rate, etc.). In this case, playback management device 245 can reduce a utilization of processing resources relative to determining the actual video encoding rate.

In some implementations, playback management device 245 can determine the application buffer size based on a buffering time parameter associated with a playback application associated with providing playback of the multimedia communication. For example, when playback management device 245 determines that a streaming video communication is for playback by a video playback application associated with a 10 second (sec) buffer time and the video is being provided at a 1.5 Mbps video encoding rate, playback management device 245 can determine the application buffer as:

$$S = R*T*(1+\alpha);$$

$$S = 1.5 \text{ Mbps} * 10 \text{ sec} * ((1+0.02)/8) = 1.875 \text{ Megabytes};$$

where S represents a size of the application buffer, R represents a video encoding rate, T represents a buffering time for the video playback application, and $\alpha$ represents a configurable parameter. In this case, a selected size of an application buffer of 1.875 Megabytes (Mb) for a streaming video can represent an approximately 95% reduction in a size of an application buffer relative to an initial application buffer size and/or a static application buffer size allocated for similar network traffic using other techniques. In this way, playback management device 245 reduces a utilization of memory resources and enables a greater quantity of connections to be supported in a network.

In some implementations, playback management device 245 can determine the application buffer size based on a network traffic congestion parameter identifying a network congestion condition. For example, playback management device 245 can determine that a proxy connection associated with the application buffer is being utilized to transfer data to a portion of a network associated with a threshold congestion level, and can determine to reduce an application buffer size to reduce congestion associated with the portion of the network. In this way, playback management device 245 reduces utilization of network resources and resulting network congestion relative to a static network configuration.

In some implementations, playback management device 245 can determine the application buffer size based on a quantity of connections associated with the network. For example, when a quantity of available connections satisfies a threshold, playback management device 245 can reduce a buffer size to increase a quantity of available connections.

In some implementations, playback management device 245 can determine multiple application buffer sizes. For example, playback management device 245 can determine a first application buffer size for a provider-side application buffer and a second application buffer size for a subscriber-side application buffer. In this case, playback management device 245 can determine a provider-side application buffer size such that the provider-side application buffer size is greater than a subscriber-side application buffer, thereby accounting for a traffic pattern resulting in greater downlink traffic to user device 205 than uplink traffic from user device 205.

In this way, playback management device determines an application buffer size for the multimedia communication.

As further shown in FIG. 4, process 400 can include causing the application buffer size to be used for an application buffer associated with the multimedia communication (block 430). For example, playback management device 245 can communicate with user device 205, proxy device 230, server device 240, and/or the like to cause the application buffer size to be used for the application buffer associated with the multimedia communication. In some implementations, playback management device 245 can assign the application buffer size to multiple application buffers, such as a provider-side application buffer associated with server device 240, a subscriber-side application buffer associated with user device 205, and/or the like.

In some implementations, playback management device 245 can release a first memory block allocated for the initial application buffer. For example, based on determining the application buffer size, playback management device 245 can assign a second memory block as an application buffer of the determined application buffer size, and can cause the first memory block to be released when data is removed from the first memory block for transmission and/or playback. In this way, based on dynamically assigning a new application buffer for multimedia communication, playback management device 245 reduces a likelihood of buffer leakage resulting from underutilizing an initial application buffer allocation.

In some implementations, playback management device 245 can release a portion of a memory block allocated for the initial application buffer. For example, after data from a first portion of the memory block (e.g., corresponding to a difference between the initial application buffer size and the determined application buffer size) is provided for playback and/or transmission, playback management device 245 can utilize a system call (e.g., a malloc( ) type of call) to dynamically cause the first portion of the memory block to be removed from the application buffer and reassigned. In this case, playback management device 245 can cause a second, remaining portion of the memory block of the determined application buffer size to remain in the application buffer. Based on releasing a portion of a memory block allocations for an application buffer, playback management device 245 reduces a likelihood that unnecessary (i.e., excessively long) buffering is performed for video communication, which can be dropped within a threshold period of time of initiation.

In some implementations, playback management device 245 can reallocate additional resources to the application buffer, such as based on determining a change to a video encoding rate, a change to an application buffer time, and/or the like. For example, based on determining a new application buffer size that is larger than a current application buffer size, playback management device 245 can increase an allocation of memory resources to a provider-side application buffer, a subscriber-side application buffer, and/or the like.

In this way, playback management device 245 causes the application buffer size to be used for an application buffer associated with the multimedia communication.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

In this way, playback management device 245 dynamically adapts an application buffer size for multimedia communication, such as streaming video communication, streaming audio communication, and/or the like. In this way, playback management device 245 improves throughput relative to a static buffer configuration and/or increases a quantity of connections relative to a static buffer configuration. Moreover, playback management device 245 reduces a likelihood of performing unnecessary buffering for multimedia communication sessions that are dropped within a threshold period of time, thereby reducing utilization of network resources relative to a static buffer configuration. Furthermore, playback management device 245 reduces a likelihood of an application buffer leaking relative to a static buffer configuration, thereby reducing a utilization of memory resources.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface can include a graphical user interface, a non-graphical user interface, a text-based user interface, etc. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
 a memory; and
 one or more processors to:
  identify a new communication associated with a proxy connection between a first device and a second device;
  perform a first buffer allocation to cause the proxy connection to be associated with a first set of buffer sizes for a first kernel layer buffer, a second kernel layer buffer, a first application layer buffer, and a second application layer buffer,
   each of the first kernel layer buffer, the second kernel layer buffer, the first application layer buffer, and the second application layer buffer being allocated a corresponding buffer size of the first set of buffer sizes;
  determine, after the first buffer allocation, that the proxy connection is associated with a multimedia communication based on using a packet snooping technique;
  determine a data encoding rate for the multimedia communication;

determine a second set of buffer sizes based on the data encoding rate; and perform a second buffer allocation to cause the proxy connection to be associated with the second set of buffer sizes, the second buffer allocation being different from the first buffer allocation, and each of the first kernel layer buffer, the second kernel layer buffer, the first application layer buffer, and the second application layer buffer being allocated a corresponding buffer size of the second set of buffer sizes.

2. The device of claim 1, where the first buffer allocation is associated with a first memory block; and where the one or more processors, when performing the second buffer allocation, are to:

select a second memory block corresponding to the second set of buffer sizes, the second memory block being different from the first memory block; and cause the second memory block to be used for a buffer associated with the proxy connection.

3. The device of claim 2, where the one or more processors are further to:

cause the first memory block to be reallocated after causing the second memory block to be used for the buffer.

4. The device of claim 1, where the first buffer allocation is associated with a particular memory block corresponding to the first set of buffer sizes; and where the one or more processors, when performing the second buffer allocation, are to:

release a portion of the particular memory block such that a remaining portion of the particular memory block corresponds to the second set of buffer sizes.

5. The device of claim 1, where a buffer size of the first application layer buffer in the first buffer allocation is less than a buffer size of the first application layer buffer in the second buffer allocation.

6. The device of claim 1, where the proxy connection is a transmission control protocol (TCP) proxy connection.

7. The device of claim 1, where the first application layer buffer is a subscriber-side application buffer and the second application layer buffer is a provider-side application buffer; and where the one or more processors, when performing the second buffer allocation, are to:

alter a buffer size of the subscriber-side application buffer and the provider-side application buffer based on the second set of buffer sizes.

8. A non-transitory computer-readable medium storing instructions, the instructions comprising:

one or more instructions that, when executed by one or more processors, cause the one or more processors to:

identify a proxy connection associated with a first device and a second device;

perform a first buffer allocation to cause the proxy connection to be associated with a first set of buffer sizes for a first kernel layer buffer, a second kernel layer buffer, a first application layer buffer, and a second application layer buffer;

determine that the proxy connection is associated with a video communication based on using a packet snooping technique;

determine a set of parameters relating to the proxy connection;

determine a second buffer allocation for the proxy connection based on the set of parameters; and perform the second buffer allocation to cause the proxy connection to be associated with a second set of buffer sizes, the second set of buffer sizes being different from the first set of buffer sizes, each of the first kernel layer buffer, the second kernel layer buffer, the first application layer buffer, and the second application layer buffer being allocated a corresponding buffer size of the second set of buffer sizes.

9. The non-transitory computer-readable medium of claim 8, where the one or more instructions, that cause the one or more processors to determine the second buffer allocation, further cause the one or more processors to:

determine the second buffer allocation based on a data encoding rate parameter, of the set of parameters, relating to the proxy connection and a buffering time parameter of the set of parameters.

10. The non-transitory computer-readable medium of claim 8, where the one or more instructions, that cause the one or more processors to determine the second buffer allocation, cause the one or more processors to:

determine the second buffer allocation based on a stored default data encoding rate parameter, of the set of parameters.

11. The non-transitory computer-readable medium of claim 8, where the one or more instructions, when executed by the one or more processors, further cause the one or more processors to:

determine that the proxy connection is associated with the video communication based on the set of parameters.

12. The non-transitory computer-readable medium of claim 8, where the first application layer buffer is a provider-side application buffer;

where the second application layer buffer is a subscriber-side application buffer; and where the one or more instructions, that cause the one or more processors to perform the second buffer allocation, cause the one or more processors to:

alter a size of the provider-side application buffer, a size of the subscriber-side application buffer being caused to be less than the size of the provider-side application buffer.

13. The non-transitory computer-readable medium of claim 8, where the first application layer buffer is a provider-side application buffer;

where the second application layer buffer is a subscriber-side application buffer; and where the one or more instructions, that cause the one or more processors to perform the second buffer allocation, cause the one or more processors to:

increase an amount of memory allocated for the subscriber-side application buffer.

14. The non-transitory computer-readable medium of claim 8, where the one or more instructions, that cause the one or more processors to determine the second buffer allocation, cause the one or more processors to:

determine the second buffer allocation based on a network traffic congestion parameter of the set of parameters.

15. A method, comprising:

identifying, by a device and based on using a packet snooping technique, a new video communication associated with a transmission control protocol (TCP) proxy connection between a user device and a server device of a network, the server device being associated with providing the new video communication to the user device for playback;

performing, by the device, a first buffer allocation to cause the proxy connection to be associated with a first set of buffer sizes for a first kernel layer buffer, a second kernel layer buffer, a first application layer buffer, and a second application layer buffer, each of the first kernel layer buffer, the second kernel layer buffer, the first application layer buffer, and the second application layer buffer being allocated a corresponding buffer size of the first set of buffer sizes;

determining, by the device and after the first buffer allocation, a video encoding rate for the new video communication;

determining, by the device, a second set of buffer sizes based on the video encoding rate; and performing, by the device, a second buffer allocation to cause the TCP proxy connection to be associated with the second set of buffer sizes, the second buffer allocation being different than the first buffer allocation, and each of the first kernel layer buffer, the second kernel layer buffer, the first application layer buffer, and the second application layer buffer being allocated a corresponding buffer size of the second set of buffer sizes.

16. The method of claim 15, where determining the second set of buffer sizes comprises:

determining the second set of buffer sizes based on a buffering time associated with a playback application of the user device.

17. The method of claim 15, where performing the first buffer allocation comprises:

allocating a first memory block for the first application layer buffer or the second application layer buffer; and where performing the second buffer allocation comprises:

allocating a second memory block for the first application layer buffer or the second application layer buffer, the second memory block being different from the first memory block.

18. The method of claim 15, where performing the first buffer allocation comprises:

allocating a particular memory block for the first application layer buffer; and where performing the second buffer allocation comprises:

reallocating a first portion of the particular memory block, a second portion of the particular memory block remaining allocated to the first application layer buffer.

19. The method of claim 15, further comprising:

detecting a network congestion condition associated with at least one of the user device or the server device; and where determining the second buffer allocation comprises:

determining the second buffer allocation based on the network congestion condition.

20. The method of claim 15, where determining the second set of buffer sizes comprises:

determining the second set of buffer sizes based on a quantity of connections that are associated with a particular portion of the network.

* * * * *